(12) United States Patent
Deck et al.

(10) Patent No.: US 12,099,124 B1
(45) Date of Patent: Sep. 24, 2024

(54) INTEGRATED SENSOR ASSEMBLY

(71) Applicant: PlusAI, Inc., Santa Clara, CA (US)

(72) Inventors: James Wiley Deck, Stafford, VA (US); Murad Mehdi Mohammad Bharwani, Mountain View, CA (US)

(73) Assignee: PlusAI, Inc., Santa Clara, CA (US)

( * ) Notice: Subject to any disclaimer, the term of this patent is extended or adjusted under 35 U.S.C. 154(b) by 0 days.

(21) Appl. No.: 18/459,213

(22) Filed: Aug. 31, 2023

(51) Int. Cl.
*G01S 17/931* (2020.01)
*B60R 11/00* (2006.01)
*B60R 11/04* (2006.01)
*G01S 7/481* (2006.01)

(52) U.S. Cl.
CPC ............ *G01S 17/931* (2020.01); *B60R 11/04* (2013.01); *G01S 7/4813* (2013.01); *B60R 2011/004* (2013.01)

(58) Field of Classification Search
None
See application file for complete search history.

(56) References Cited

U.S. PATENT DOCUMENTS

| | | | |
|---|---|---|---|
| 2011/0163904 A1* | 7/2011 | Alland | B60R 1/00 342/52 |
| 2020/0290505 A1* | 9/2020 | Herrmann | B60Q 1/2607 |
| 2021/0341613 A1* | 11/2021 | Adams | G01S 17/89 |
| 2021/0349180 A1* | 11/2021 | Han | G01S 13/931 |
| 2022/0169178 A1* | 6/2022 | Herrmann | B60Q 9/008 |

* cited by examiner

*Primary Examiner* — Luke D Ratcliffe
(74) *Attorney, Agent, or Firm* — Kilpatrick Townsend & Stockton LLP

(57) ABSTRACT

An integrated sensor assembly is described. The integrated sensor assembly can include a housing comprising a compartment. The housing can be arranged on a side surface of a cabin of an autonomous vehicle and within a threshold distance of a cabin roof of the autonomous vehicle. The assembly can include a first sensor arranged in the compartment, the first sensor configured to receive a first signal from a vehicle computer and collect information for mapping an environment of the autonomous vehicle. The assembly can include a light source arranged in the compartment. The light source configured to receive a second signal from the vehicle computer and emit a light pattern for visually indicating one of a hazard, a turn, or an autonomous mode. The light source can be arranged in the compartment to emit light to traffic toward a rear of the autonomous vehicle.

9 Claims, 10 Drawing Sheets

INTEGRATED SENSOR ASSEMBLY

BACKGROUND

Various vehicles employ computing means to aid automated vehicle operation. Recently, in the automotive industry, much of the focus is on making a vehicle operate in an autonomous mode in a safe manner.

An autonomous vehicle (AV) can include a sensor connected to a side-view mirror of the AV. Given their placement in relation to a roadway and other vehicles, these sensors are prone to being struck by other vehicles and objects on the roadway. Embodiments are directed to address these and other problems, individually and collectively.

BRIEF SUMMARY

Embodiments described herein are directed toward an integrated sensor assembly, including a housing comprising a compartment, the housing arranged on a side surface of a cabin of an autonomous vehicle and proximate to a cabin roof of the autonomous vehicle. The integrated sensor assembly further includes a first sensor arranged in the compartment. The first sensor configured to receive a first signal from a vehicle computer and collect information for mapping an environment of the autonomous vehicle. The integrated sensor assembly further includes a light source arranged in the compartment. The light source can be configured to receive a second signal from the vehicle computer and emit a light pattern for visually indicating a hazard. The light source can be arranged in the compartment to emit light to traffic toward a rear of the autonomous vehicle.

Embodiments can further include a method for fabricating an integrated sensor assembly. The method can include injecting a polymer into a mold of a housing base. The method can further include cooling the mold to form the housing base, the housing base forming a compartment, and the housing base comprising a first opening and a second opening. The method can further include arranging a first sensor in the compartment. The first sensor can be arranged to permit a signal emit from the first opening. The method can further include arranging a light source in the compartment inward from the first sensor and the second opening. The method can further include sealing the second opening of the housing base with a cover plate, the cover plate comprising a third opening for permitting a light from the light source to be emitted to form an integrated sensor assembly.

Embodiments can further include a method for using the integrated sensor assembly. The method can include an integrated sensor assembly receiving a first signal from a vehicle computer of an autonomous vehicle. The method can further include the integrated sensor assembly. The method can further include collecting sensor information for mapping an environment of the autonomous vehicle at a first time interval and based on the first signal. The integrated sensor assembly can be arranged on a side surface of a cabin of the autonomous vehicle and proximate to a cabin roof of the autonomous vehicle. The method can further include the integrated sensor assembly transmitting the first sensor information to a vehicle computer. The method can further include the integrated sensor assembly receiving a second signal from the vehicle computer of the autonomous vehicle based on the transmitted sensor information. The method can further include the integrated sensor assembly emitting a light indicating a turn based on the second signal at a second time interval.

Other embodiments of this aspect include corresponding computer systems, apparatus, and computer programs recorded on one or more computer storage devices, each configured to perform the actions of the methods.

Further details regarding embodiments can be found in the Detailed Description and the Figures.

Figure 10:
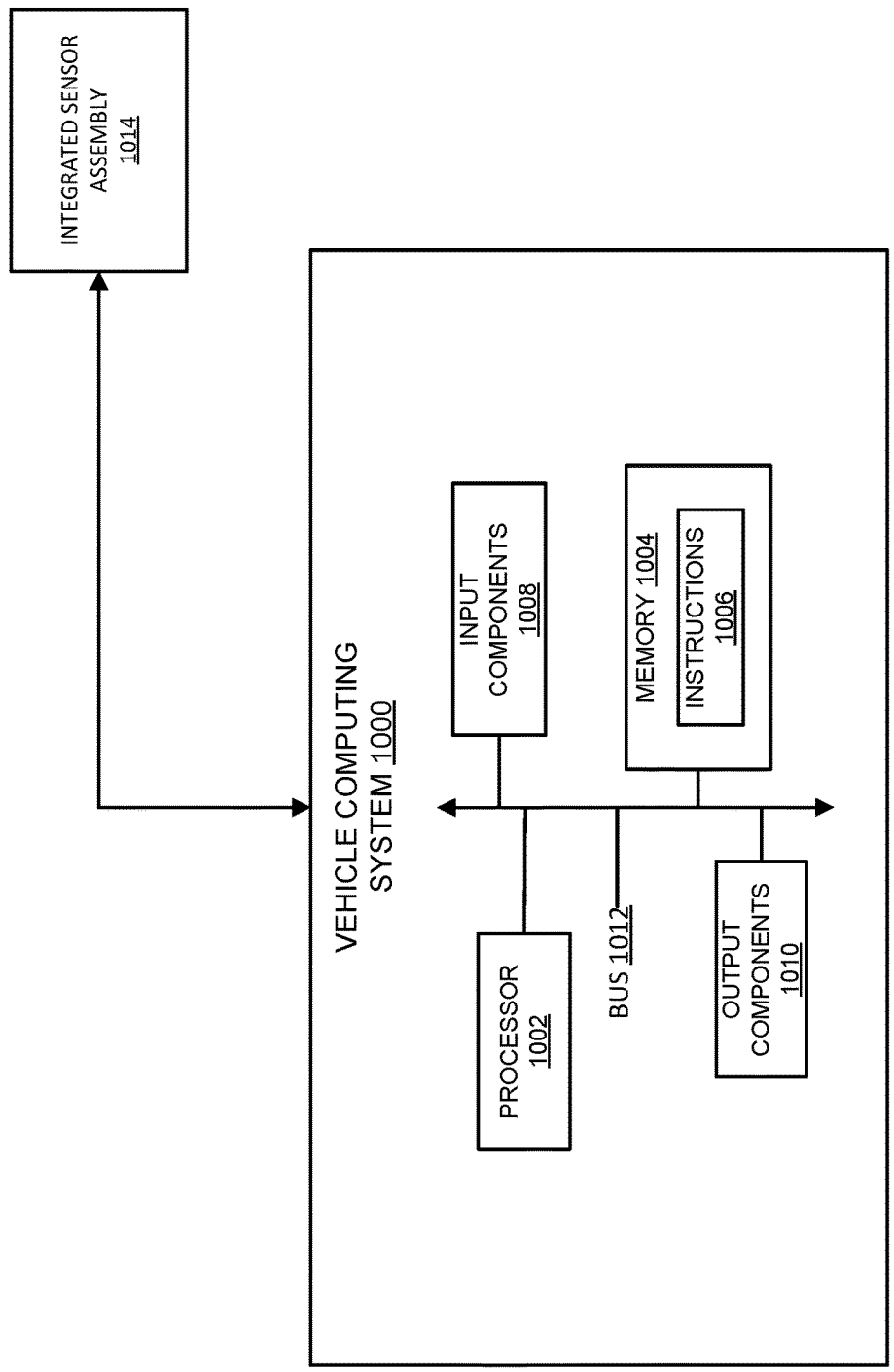

The FIG. 10 is a block diagram of an example of a computing system, according to one or more embodiments.

DETAILED DESCRIPTION

In the following description, various embodiments will be described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Prior to discussing embodiments, some terms can be described in further detail.

As used herein, a "vehicle" may include, for example, a fully autonomous vehicle, a partially autonomous vehicle, a vehicle with driver assistance, or an autonomous capable vehicle. The capabilities of autonomous vehicles can be associated with a classification system or taxonomy having tiered levels of autonomy. A classification system can be specified by, for example, industry standards or governmental guidelines. For example, the levels of autonomy can be considered using a taxonomy such as level 0 (momentary driver assistance), level 1 (driver assistance), level 2 (additional assistance), level 3 (conditional assistance), level 4 (high automation), and level 5 (full automation without any driver intervention). Following this example, an autonomous vehicle can be capable of operating, in some instances, in at least one of levels 0 through 5. According to various embodiments, an autonomous capable vehicle may refer to a vehicle that can be operated by a driver manually (that is, without the autonomous capability activated) while being capable of operating in at least one of levels 0 through 5 upon activation of an autonomous mode.

As used herein, the term "driver" may refer to a local operator (e.g., an operator in the vehicle) or a remote operator (e.g., an operator physically remote from and not in the vehicle). The autonomous vehicle may operate solely at a given level (e.g., level 2 additional assistance or level 5 full automation) for at least a period of time or during the entire operating time of the autonomous vehicle. Other classification systems can provide other levels of autonomy characterized by different vehicle capabilities.

A "vehicle computer" may include one or more processors and a memory. A "processor" may include any suitable data computation device or devices. A processor may comprise one or more microprocessors working together to accomplish a desired function. A "memory" may be any suitable device or devices that can store electronic data. A suitable memory may comprise a non-transitory computer readable medium that stores instructions that can be executed by at least one processor to implement a desired method. Examples of memories may comprise one or more memory chips, disk drives, etc. Such memories may operate using any suitable electrical, optical, and/or magnetic mode of operation.

Details of some embodiments will now be described in greater detail.

Semi-trucks are an essential part of the modern economy, and a majority of our goods are transported across our highways using semi-trucks. In order to accommodate commercial vehicles, such as semi-trucks, as well as non-commercial vehicles, such as private vehicles, regulations are imposed to limit vehicle size. These regulations apply to autonomous vehicles and non-autonomous vehicles. For example, under the Surface Transportation Assistance Act (STAA) of 1982, a commercial motor vehicle (CMV) has a width requirement of 102 inches, excluding mirrors and certain safety devices. However, even the width of mirrors and certain safety devices on a CMV have limits before the CMV is designated an over-dimensional vehicle and requires wide load signage.

One issue for AVs is arranging a light detection and ranging (LiDAR) system on the AV, such that the LiDAR can effectively collect information from the environment and comply with any dimensional regulations. LiDAR systems rely on emitting pulses of near visible ultraviolet (UV) to near visible infrared (IR) and collecting time information for the emissions and any collected reflected signals. Using the timing information and knowing the position and orientation of the LiDAR sensor, the position of a surrounding object can be calculated. Today AVs, such as semi-trucks, attach LiDAR sensors to the side-view mirrors, which enables the LiDAR sensors to have good coverage and be excluded from width requirements. However, the side-view mirrors on a semi-truck are generally low enough that the mirrors and LiDAR sensors are susceptible to striking other objects.

Embodiments described herein address the above-referenced issues by providing an integrated sensor assembly that includes a LiDAR sensor, a turn signal indicator, and a hazard signal indicator contained in a common housing and controlled by the same electrical system. The integrated sensor assembly can be arranged on the semi-truck cabin at a higher elevation than the side-view mirrors to permit the LiDAR sensors to have a suitable field-of-view, be protected from collisions with objects, and permit other drivers to see the turn signals and hazard lights.

Figure 1A:
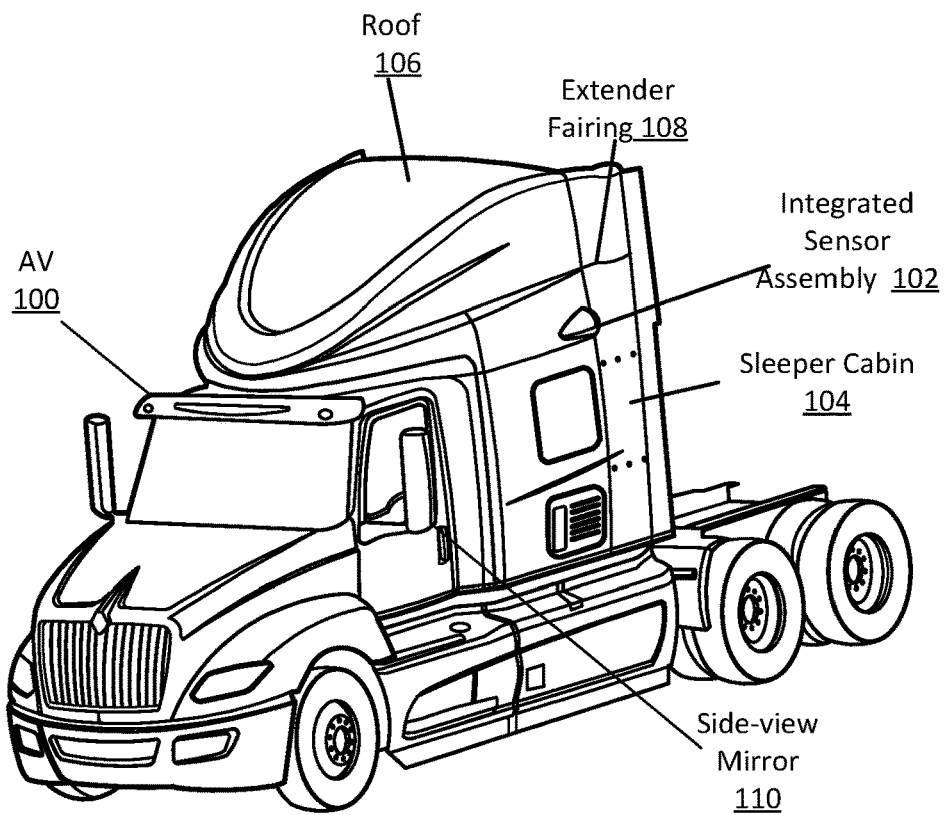
FIG. 1A is an illustration of a side view of an AV with an integrated sensor assembly, according to one or more embodiments.

FIG. 1A is an illustration of a side view of an AV with an integrated sensor assembly, according to one or more embodiments. As illustrated, the AV 100 includes an integrated sensor assembly 102 attached to a side surface of the sleeper cabin 104. The integrated sensor assembly 102 is arranged proximate to the roof 106 and an extender fairing 108. The integrated sensor assembly 102 can be arranged, for example, at a threshold elevation from a reference surface, where the reference surface can be a ground surface. In other instances, the reference surface can be a higher or lower elevation than the ground surface. For example, if the ground surface is compressible (e.g., similar to sand), the reference surface can be lower than the ground surface. If the AV is expected to travel under low overpasses, the reference surface can be higher than the ground surface. The integrated sensor assembly 102 is further arranged at a higher elevation than the side-view mirror 110. The integrated sensor assembly 102 can include a sensor (e.g., radar, cameras, lidar, other sensors) and a light source that are connected to the vehicle computer via a common bus cable. The light source is configured to emit light in one of a plurality of patterns to indicate a status of the AV. For example, the light source can emit light in a first pattern to indicate that the vehicle is about the make a turn, or the light source can emit a light in a second pattern indicating a hazard. In some instances, the light source can emit a light in a third pattern indicating the AV is in an autonomous mode. In some instances, the light source includes a first bulb or light emitted diode (LED) for visually indicating one of the hazard or the turn, and the light source also includes a second bulb or LED for visually indicating the autonomous mode.

Figure 1B:
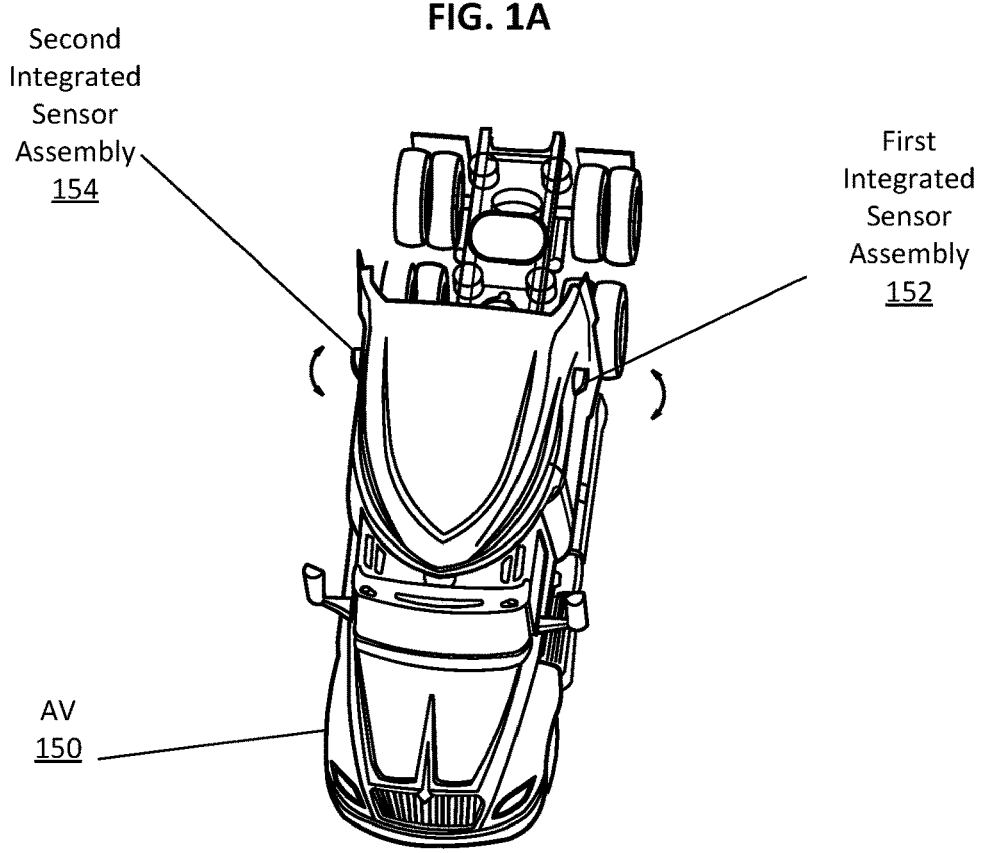
FIG. 1B is an illustration of a plan view of an AV with integrated sensor assemblies, according to one or more embodiments.

FIG. 1B is an illustration of a plan view of an AV with integrated sensor assemblies, according to one or more embodiments. An AV 150 (e.g., the AV 100) can include a first integrated sensor assembly 152 arranged on a driver side of the AV 150 and a second integrated sensor assembly 154 arranged on the passenger side of the AV 150. Each of the integrated sensor assemblies can include sensor equipment along with light sources, which provide the functionality for both turn signals and hazard lights. The integrated sensor assemblies can be located higher than the side view mirrors on the AV 150 to provide a greater field-of-view for the sensors along with providing necessary signaling to other drivers on the road. Arranging the integrated sensor assemblies higher than the mirrors reduces the opportunities for another vehicle or an object to collide with the integrated sensor assemblies.

Moreover, the placement and number of the integrated sensor assemblies are not limited to what is illustrated in FIG. 1B. According to various embodiments, the AV may include additional integrated sensor assemblies distributed along the AV based on the requirements of the status indicated using the integrated sensor assemblies. According to various embodiments, one or more of the integrated sensor assemblies may be provided at a predetermined distance from the roof of the AV, and above a predetermined distance from a plane comprising the top surface of the side mirrors.

Figure 2A:
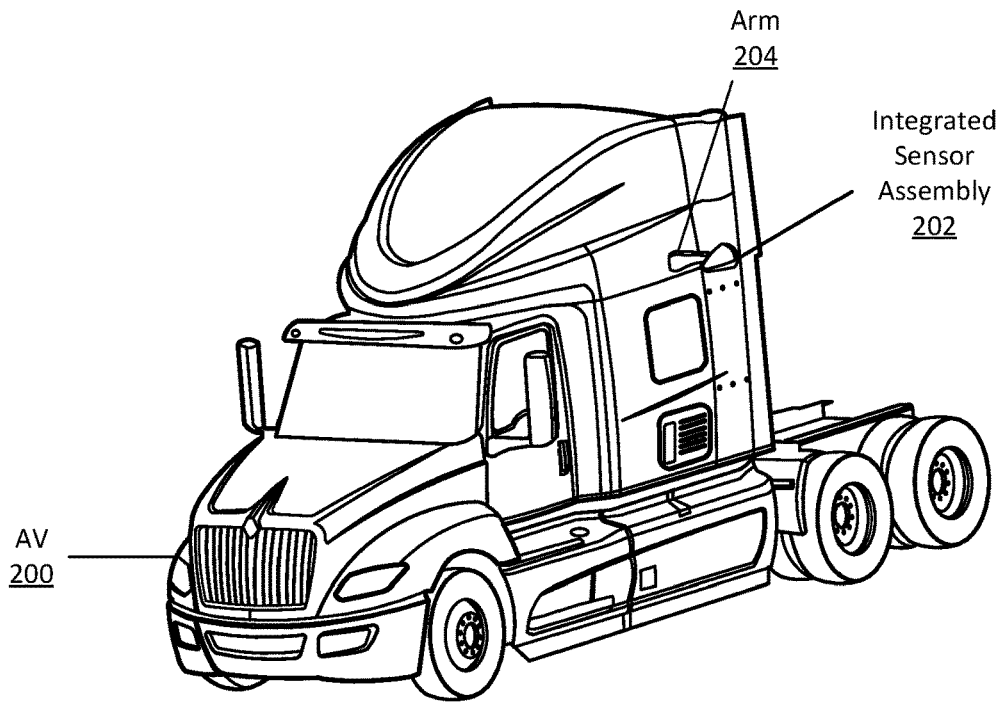
FIG. 2A is an illustration of a side view of an AV with an integrated sensor assembly with an arm, according to one or more embodiments.

FIG. 2A is an illustration of a side view of an AV with an integrated sensor assembly with an arm, according to one or more embodiments. As illustrated, the AV 200 includes an integrated sensor assembly 202 that is connected to the AV 200 via an arm 204. The arm 204 enables the integrated sensor assembly 202 to be extended away from the AV 200. In some embodiments, the length of the arm can be configured such that the width of the AV, including the added width of the integrated sensor assembly 202 is less than a width requirement that would cause the AV 200 to be considered an over-dimensional vehicle and require a wide load banner.

Figure 2B:
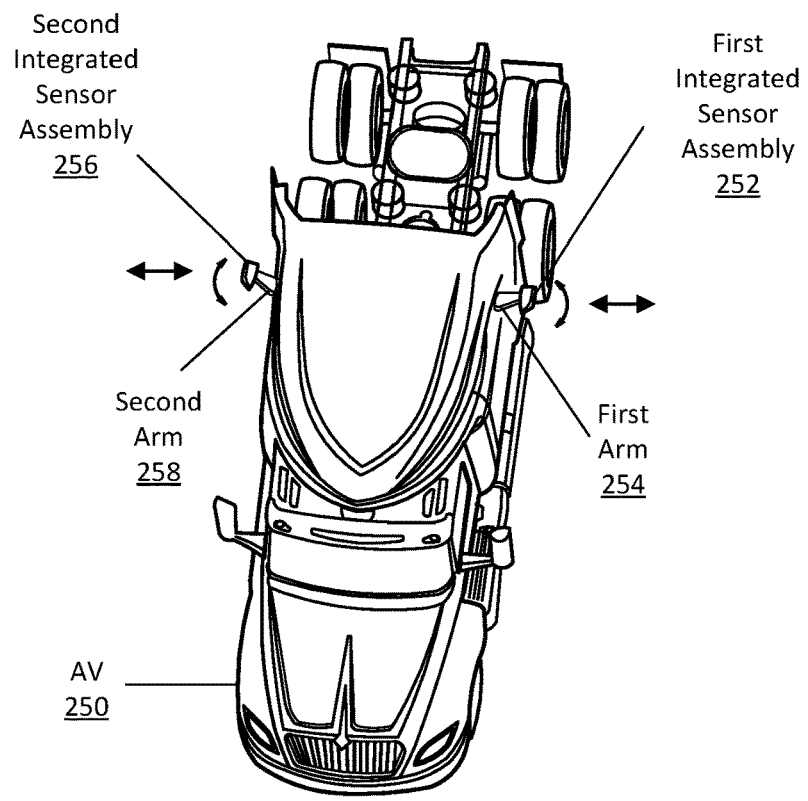
FIG. 2B is an illustration of a plan view of an AV with integrated sensor assemblies with arms, according to one or more embodiments.

FIG. 2B is an illustration of a plan view of an AV with integrated sensor assemblies with arms, according to one or more embodiments. An AV 250 (e.g., the AV 200) can include a first integrated sensor assembly 252 connected to a driver side of the AV 250 via a first arm 254. The AV 250 can further include a second integrated sensor assembly 256 connected to the passenger side of the AV 250 via a second arm 258. The first arm 254 and the second arm 258 can be arranged orthogonally from the respective side surface of the cabin. Each of the integrated sensor assemblies can include sensor equipment along with light sources, which provide the functionality for both turn signals and hazard lights. The integrated sensor assemblies can be located higher on the AV 250 than the AV side-view mirrors and extend further out than the first integrated sensor assembly 152 and the second integrated sensor assembly 154 of FIG. 1B. This can provide a greater field-of-view for the sensors along with providing necessary signaling to other drivers on the roadway.

The placement and number of the integrated sensor assemblies are not limited to that is illustrated in FIG. 2B. According to various embodiments, the AV may include additional integrated sensor assemblies distributed along the AV based on the requirements of the status indicated using the integrated sensor assemblies. According to various embodiments, one or more of the integrated sensor assemblies may be coupled to the via an arm while one or more of the integrated sensor assemblies may be coupled directly to a body of the AV.

In some embodiments, the integrated sensor assemblies can include a respective actuator to permit the integrated sensor assemblies to move and be in a closed state or an open state. The motion of the integrated sensor assembly can serve multiple purposes. One purpose can be to protect the integrated sensor assembly from damage, and the other purpose can be to change a field of view of a sensor, such as a LiDAR sensor included in an integrated sensor assembly.

As illustrated in FIGS. 1 and 2, the integrated sensor assemblies can rotate. The closed state can be when the integrated sensor assembly is retracted inward toward the cabin or rotated inward into the cabin. In some instances, while in the closed state, the integrated sensor assembly can be hidden, such that the integrated sensor assembly is inside the cabin of the AV. The housing of the integrated sensor assembly can include a flat surface. Therefore, in the closed state, the flat surface of the housing can be flush with a side surface of the cabin. In this state neither the light source, nor any sensor openings would be visible from outside the AV. The vehicle computer can send a signal to the actuator to change from a closed state to an open state. In response, the actuator can rotate the integrated sensor assembly to expose the sensors for collecting data and expose the light source for emitting a light for surrounding traffic. As will be described further below, the integrated sensor assembly can receive a bus cable with all wiring from a single opening. Having all of the wiring enter from a single opening permits the integrated sensor assembly to rotate without adding tension to the wiring. For example, if a portion of the wiring entered through one opening and a balance of the wiring entered through another opening, the rotation may can one set of wires to be pull and the other set pulled. This constant exertion of opposite forces on the wiring can damage the wiring's integrity.

The integrated sensor assembly can also extend away from the side surface of the AV cabin. For example, the integrated sensor assembly can extend and retract in an orthogonal direction from the side surface of the AV cabin. For example, referring to FIG. 2, the actuator can extend or retract the arm. The length of the arm can be variable depending on the degree of extension or retraction. For example, the actuator can retract the arm to be arranged in the cabin and hidden externally from the AV. In some instances, the actuator can retract and extend the arm based on a manual from a driver. In other instances, the arm can be retractable and extendable based on a signal quality of the collected sensors signals. For example, the sensor(s) can either periodically transmit a reference signal or use a signal otherwise to be transmitted by the sensor as a reference signal. The sensor can collect a reflected signal, and transmit the signals to the vehicle computer. The vehicle computer can determine the signals parameters to determine a signal quality or signal strength of any reflected signal. The signal quality and signal strength can be compared to respective thresholds. If the signal quality and signal strength are acceptable based on the thresholds, the length of the arm can remain. If the signal quality and the signal strength are unacceptable, the vehicle computer can retrieve a set of arm lengths and cause the actuator to adjust the arm length to each arm length of the set of arm lengths. At each arm length, the vehicle computer can cause the sensor(s) to emit a reference signal. The vehicle computer can receive the reflected signal from the sensor(s), determine the signal parameters. The vehicle computer can use the signal parameters to determine the signal quality and signal strength to respective thresholds. The vehicle computer can then determine which arm lengths resulted in acceptable signal strength and quality and which result in unacceptable signal strength and quality. The vehicle computer can then send a signal to the actuator to adjust the length of the arm based on the signal strength and signal quality.

The arm length can also be adjusted to protect the integrated sensor assembly. For example, if the integrated sensor assembly is extended and collects signals to indicate that an object is continuously closer than a threshold distance for a period of time (e.g., an object has been closer than a threshold distance for one continuous minute). Additionally, the vehicle computer can determine that more than one object has been closer than the threshold for some period of time within an overall time interval. For example, a first object was closer than the threshold distance for fifteen seconds and a second object was closer than the threshold for five seconds, and both were closer than the threshold distance within a total span of a minute. In these instances, the vehicle computer can retract the arm by a threshold length to protect integrated sensor assembly from colliding with an object.

The integrated sensor assembly can transition from a closed state to an open state, or an open state to a closed state based on various triggers. For example, the integrated sensor assembly can transition from a closed state to an open state based on the AV engine being off to the AV engine being turned on. Additionally, the integrated sensor assembly can transition from an open state to a closed state based on the AV engine being on to the AV engine being turned off.

Another trigger for transitioning from a closed state to an open state, is the AV switching from a manual mode to an autonomous mode. Additionally, another trigger for transitioning from an open state to a closed state, is the AV switching from an autonomous mode to a manual mode. For example, the vehicle computer can transmit a signal to the actuator that the AV is changing from a manual mode to an autonomous mode. The actuator can cause the integrated sensor assembly to change from a closed state to an open state (e.g., rotates outwards, extends outwards). The actuator can send a signal back to the vehicle computer that the integrated sensor assembly is in an open state. In response, the vehicle computer can send a signal(s) to each sensor(s) arranged in the integrated sensor assembly to initialize and begin collecting information about the surrounding environment. Furthermore, the vehicle computer can send a signal to the light source to indicate that the AV is in autonomous mode. In some instances, the integrated sensor assembly as more than bulb or light emitted diode (LED) for the light source, where one bulb or LED is used to indicate turns or hazards, and the other bulb or LED is used to indicate whether or not the vehicle is in an autonomous mode. At some point, the vehicle computer can send a signal to the actuator that the AV is changing from an autonomous mode to a manual mode. The vehicle computer can further send a signal(s) to the sensor(s) arranged in the integrated sensor assembly to power down (or enter a sleep mode) and stop collecting data. The sensor(s) can transmit a signal(s) to the actuator that the sensors have stopped collecting data. In response the actuator can move the integrated sensor assembly from an open state to a closed state.

Figure 3:
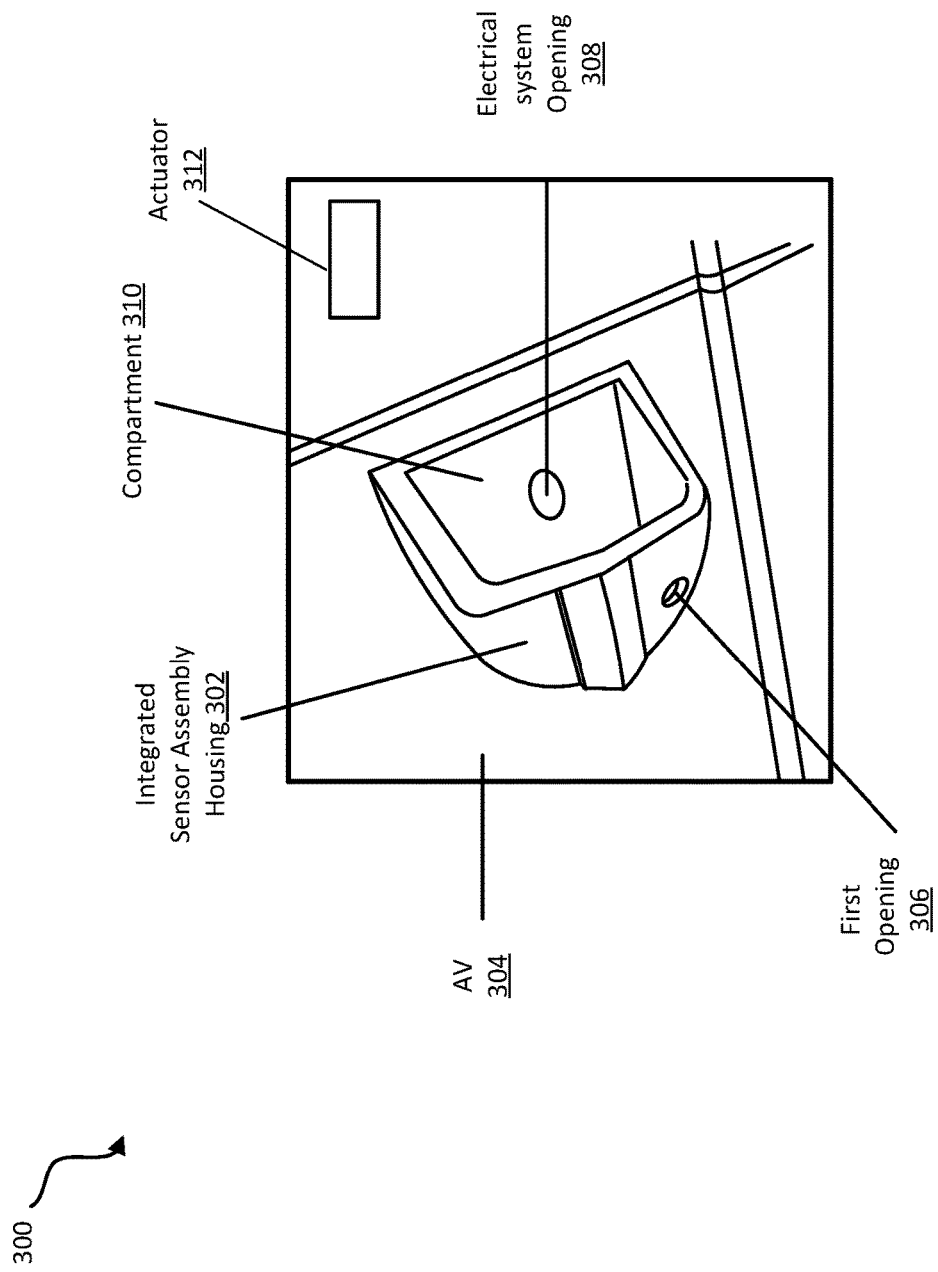
FIG. 3 is an illustration of an integrated sensor assembly housing, according to one or more embodiments.

FIG. 3 is an illustration 300 of an integrated sensor assembly housing, according to one or more embodiments. As illustrated, the integrated sensor assembly housing 302 is arranged on an AV 304. For example, the integrated sensor assembly housing 302 can be arranged on a sleeper cabin of the AV 304 at an elevated position above a side-view mirror of the AV 304.

The integrated sensor assembly housing 302 can be attached to a side surface of the AV using an adhesive or mechanically using a fastener. In some other instances, the integrated sensor assembly housing 302 can be integrally formed with an AV cabin or sleeper cabin panel. The integrated sensor assembly housing 302 can be formed from an electromagnetic interference (EMI) shielding material, such as an EMI shielding plastic, conductive metal, or metalized plastic. In some other embodiments, the integrated sensor assembly housing 302 can be coated with an EMI shielding material that can prevent external signals from interfering with the sensor(s) (e.g., LiDAR sensor) housed in the integrated sensor assembly housing 302.

The integrated sensor assembly housing 302 can include one or more sensor opening(s) for permitting a sensor to interact with a surrounding environment. For example, an image capturing device can be positioned to capturing one or more images from the surrounding environment. The integrated sensor assembly housing 302 can further include an electrical system opening 308 to permit a bus cable from an electrical system to traverse and be connected to any light source and sensor(s) housed in the integrated sensor assembly housing 302. For example, the vehicle computer system can communicate with the one or more sensor(s) using the bus cable. Additionally, a power source (e.g., a vehicle battery) can supply power to the one or more sensor(s) and the light source using the bus cable.

The integrated sensor assembly housing 302 can have an aerodynamic contour to help reduce drag as the AV is traveling. For example, the integrated sensor assembly housing 302 can have a smooth surface and a generally conical shape. The integrated sensor assembly housing 302 can be hollow and form a compartment 310 to house one or more sensor(s) and a light source. As indicated above, as the integrated sensor assembly housing 302 can include an EMI shielding material, a sensor housed in the compartment 310 can be protected from interference caused by external signals. The integrated sensor assembly can further include an actuator 312 for rotating the integrated sensor assembly to reach an open state or a closed state. In some instances, the actuator 312 can cause the integrated sensor assembly, in a closed state, to rotate inward into the cabin, such that the integrated sensor assembly is hidden.

It should be appreciated that a back plate of the integrated sensor assembly housing 302 has been removed to illustrate the compartment 310 as shown in FIG. 3. In practice, the integrated sensor assembly housing 302 is an enclosed structure to secure any light source and one or more sensor(s) provided therein.

Figure 4:
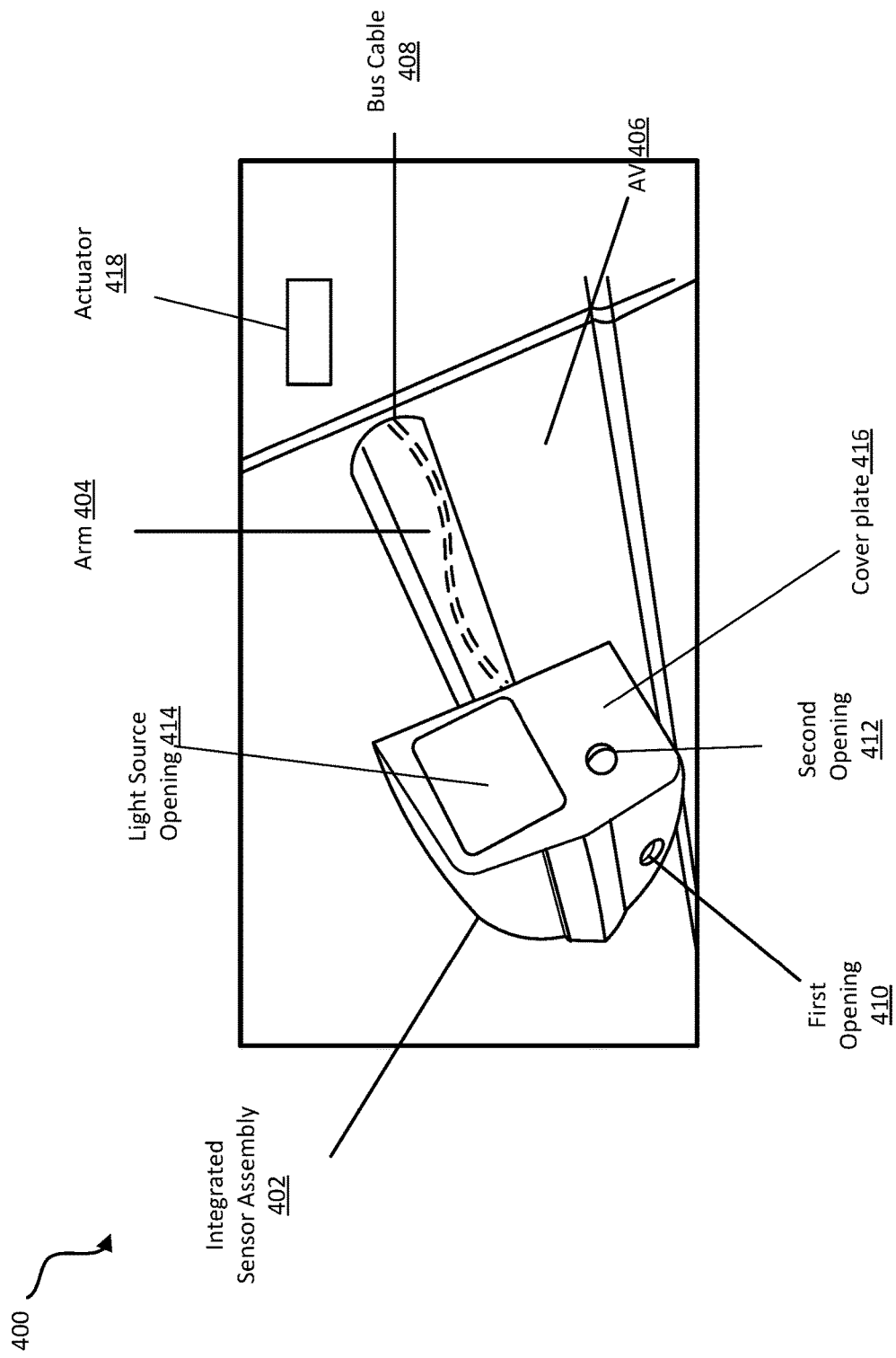
FIG. 4 is an illustration of an integrated sensor assembly with an arm, according to one or more embodiments.

FIG. 4 is an illustration 400 of an integrated sensor assembly with an arm, according to one or more embodiments. As illustrated, the integrated sensor assembly 402 includes an arm 404 for connecting to the AV 406. The arm 404 can be attached to the integrated sensor assembly 402 and the AV 406 using an adhesive, or mechanically using a fastener. In some other instances, the integrated sensor assembly housing and the arm 404 can be integrally formed with an AV cabin or sleeper cabin panel.

The arm 404 can be hollow to allow a bus cable 408 to pass through. As illustrated, a set of wires is arranged in the hollow portion of the arm 404. For example, the light source and the one or more sensor(s) can receive power and signaling via the bus cable 408. In a conventional AV, the sensor and the lights are located in different areas of the vehicle. For example, a sensor is located on a side-view mirror and the turn and hazard signals are located elsewhere, such as on a fender above a wheel or on a T-bar panel proximate to the rear wheels. In any case, the distinct locations of the sensor and the lights require respective electrical wiring to each location. By integrating the sensor and the light source into a single assembly, the complexity of the AV wiring is reduced by enabling a single bus cable 408 to be directed toward the one or more sensor(s) and the light source.

The integrated sensor assembly housing illustrated in FIG. 4 is an enclosed housing such that the compartment 310 of FIG. 3 is not illustrated. As illustrated in FIG. 4, the integrated sensor assembly 402 includes a first opening 410 and a second opening 412 arranged to permit a sensor to emit and collect signals. The sensor openings can be arranged to maximize the sensor's field of view around the AV 406. For example, the first opening 410 is arranged to permit a sensor to emit a signal to the driver side of the surrounding environment. Furthermore, the second opening 412 is arranged to permit a sensor to emit a signal at an environment to the rear of the AV 406. The integrated sensor assembly 402 can further include a light source opening 414 to permit a housed light source to emit a light, such as a turn signal light or a hazard light. For example, a driver can move a turn signal lever to indicate that the AV 406 is going to turn left. The light source can receive power via the bus cable 408 and emit a left turn indication light that is emitted through the light source opening 414. In some embodiments, the light is an amber light and exhibits a blinking pattern indicative of a turn signal. The light source opening 414 is oriented on a cover plate 416 and toward the rear of the AV 406 similar to the second opening 412. Therefore, the light that is emitted through the light source opening 414 is visible to traffic approaching from the rear of the AV 406. In some embodiments, a transparent member can be fitted into the light source opening to protect the one or more sensor(s) and the light source from particulates entering the housing. In some embodiments, the light source opening 414 can be a wraparound opening to permit light to be directed from a side of the AV 406. The integrated sensor assembly can further include an actuator 418 for rotating the integrated sensor assembly to reach an open state or a closed state. In some instances, the actuator 418 can cause the integrated sensor assembly, in a closed state, to rotate inward into the cabin, such that the integrated sensor assembly is hidden. In addition, the actuator 418 can extend or retract the arm in an orthogonal direction.

Figure 5:
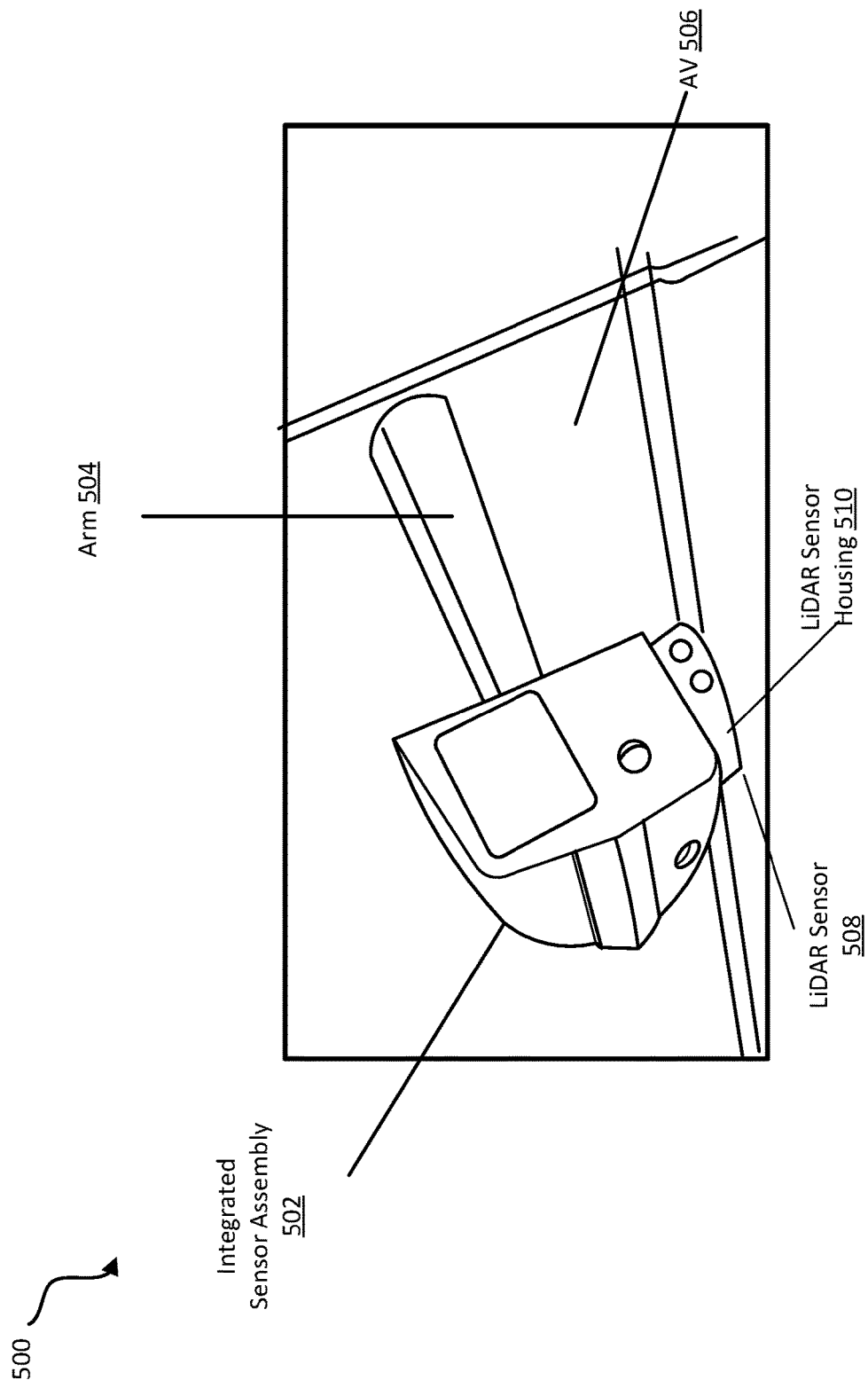
FIG. 5 is an illustration of an integrated sensor assembly with sensor, according to one or more embodiments.

FIG. 5 is an illustration 500 of an integrated sensor assembly with an arm, according to one or more embodiments. As illustrated, the integrated sensor assembly 502 includes an arm 504 for connecting to the AV 506. The arm 504 can be attached to the integrated sensor assembly 502 and the AV 506. As illustrated a LiDAR sensor 508 is partially exposed from the integrated sensor assembly 502. The LiDAR sensor 508 can include a LiDAR sensor housing 510 that includes, for example, a tilting mirror, encoder circuitry, and a laser source. A servo-motor can enable the LiDAR sensor 508 to rotate. As illustrated the LiDAR sensor can include two lenses to enable the LiDAR sensor 508 to emit and receive signals. The integrated sensor assembly 502 can include, for example, decoder circuitry for the LiDAR sensor 508. The placement of the LiDAR sensor 508 at the elevated position can enhance the sensor's field of view, where the field of view is based on the angle that the LiDAR signals are emitted.

Figure 6:
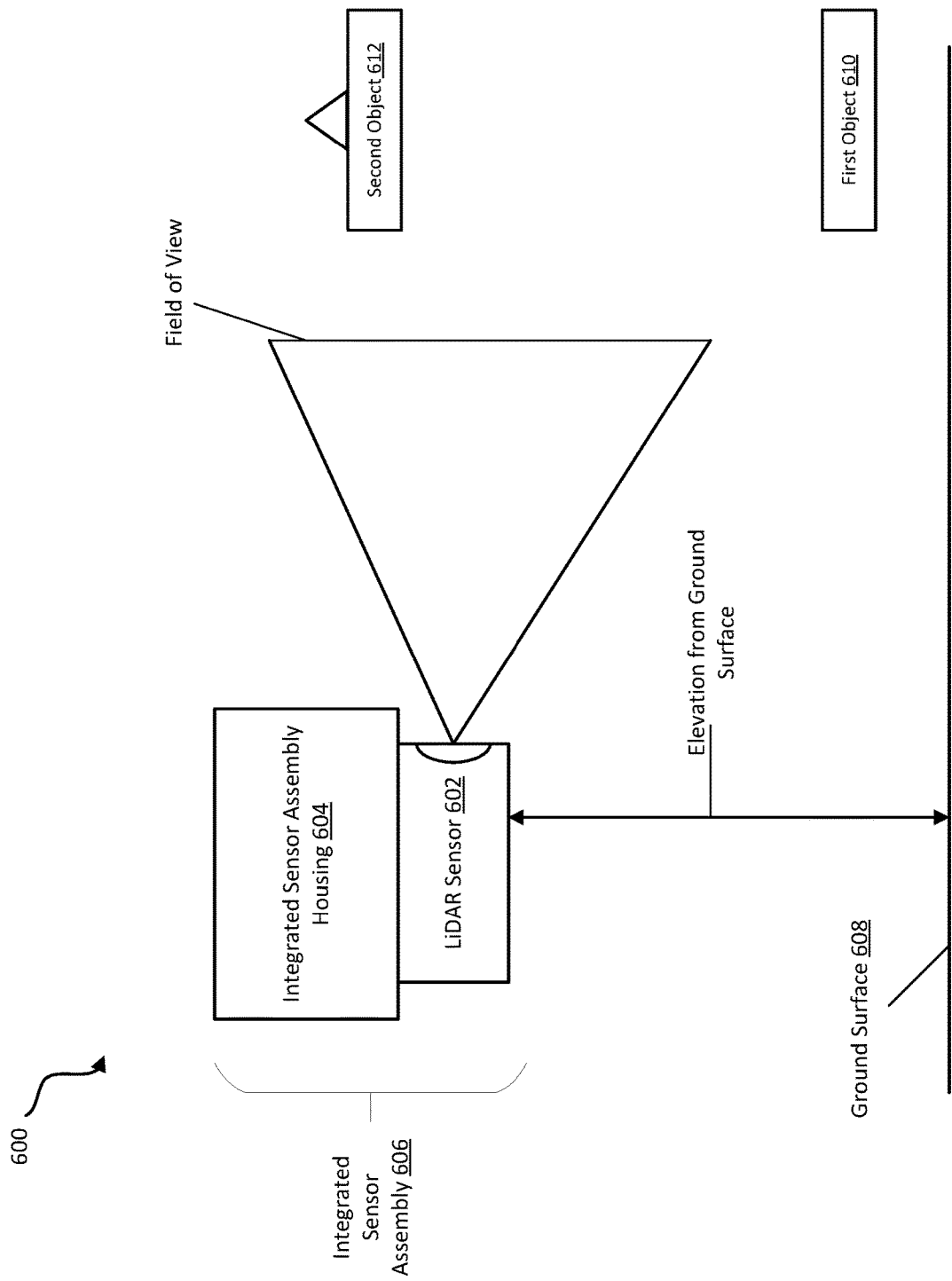
FIG. 6 is an illustration of an integrated sensor assembly, according to one or more embodiments.

FIG. 6 is an illustration 600 of an integrated sensor assembly, according to one or more embodiments. As illustrated in FIG. 6, the LiDAR sensor 602 is exposed from the integrated sensor assembly housing 604. The integrated sensor assembly 606 has been elevated from the ground surface 608. For example, the integrated sensor assembly 606 can be elevated as illustrated in FIGS. 1A, 1B, 2A, and 2B. The LiDAR sensor 602 can emit signals and collect reflected signals from surrounding objects. For example, an AV can be surrounded by a first object 610 and a second object 612, where the second object has an elevated position over the first object 610. For the elevated position, the LiDAR sensor 602 can emit signals and collect reflected signals from the first object 610, including a top surface of the first object 610. Further, at the elevated position as illustrated, the LiDAR sensor 602 can emit signals and collect reflected signals from the second object 612, including the top surface. Consider a scenario, in which the integrated sensor assembly 606 is positioned closer to the elevation of the first object 610. Even if the LiDAR sensor 602 can emit signals and collect reflected signals from the second object 612, the top surface profile of the second object 612 may not be included. This can be impactful, if the top surface of the second object 612 is relevant to the AV. For example, as illustrated, the top surface of the second object includes an angled surface profile. This information can provide additional details to a vehicle computer for processing a surrounding environment and decision making tasks. Therefore, in addition to protecting the integrated sensor assembly 606 from colliding with another object, the elevation of the integrated sensor assembly 606 can result in better sensor information.

In some instances, an AV can be expected to travel near surrounding objects with expected height ranges. For example, in rural areas, an AV can be expected to travel near stop signs that include railroad crossing crosses. In areas near water, an AV can be expected to travel near cars with canoes, and surfboards mounted on top. On highways, an AV can be expected to travel near trucks that have "wide load" signs mounted on the roof. In each of these situations, an elevated position for the integrated sensor assembly 606 can both protect against collisions and provide improved sensor information. Furthermore, the expected height ranges may be different for each situation. For example, a truck with a "wide load" sign mounted on top can be expected to be higher from a ground surface, than a station wagon with a canoe mounted on top.

Therefore, the threshold elevation of the integrated sensor assembly 606 from the ground surface 608 (e.g., a reference surface) can be determined based on the height of the objects expected to surround the AV. For example, elevation can be based on determining an expected height of an object that the AV is expected to travel near. Then, based on the expected height, determining a position of the integrated sensor assembly 606 to obtain a field of view of the object, while positioned above the object to avoid a collision with the object.

Figure 7:
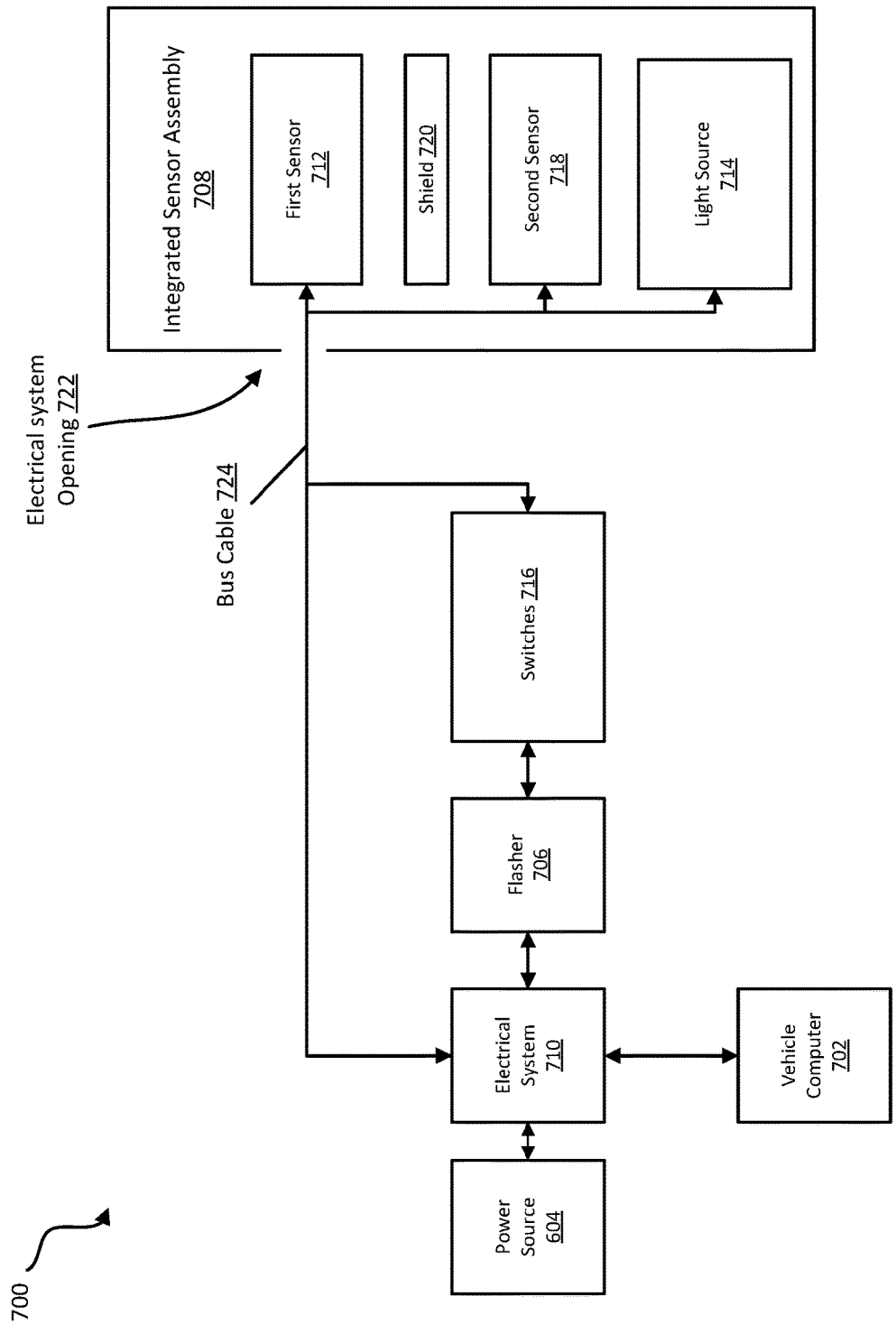
FIG. 7 is an illustration of an integrated sensor assembly, according to one or more embodiments.

FIG. 7 is an illustration of a vehicle computing system connected to an integrated sensor assembly, according to one or more embodiments. The vehicle computer 702 is connected to a power source 704, a flasher 706, and the integrated sensor assembly 708 via an electrical system 710. The electrical system 710 can include a bus cable that includes wires for delivering power from the power source 704 and communicating with the integrated sensor assembly 708 via signaling.

The vehicle computer 702 can be configured to communicate with the integrated sensor assembly 708, and in particular, communicate with any sensor(s) arranged and any light source(s) (e.g., a light bulb or light emitting device (LED)) arranged in the integrated sensor assembly 708. As indicated above, the integrated sensor assembly 708 can include a first sensor 712 for collecting information to map the environment of the AV. For example, the integrated sensor assembly 708 can include a LiDAR sensor (e.g., as illustrated in FIG. 5) configured to emit laser pulses onto the surrounding environment and collect reflected signals. The vehicle computer 702 can transmit control instructions via the electrical system 710 to the first sensor 712 to cause the first sensor 712 to collect data. The first sensor 712 can return collected data back to the vehicle computer 702 via the electrical system 710.

The vehicle computer 702 can further transmit signals via the electrical system 710 to cause the light source 714 to emit a light in a hazard light pattern or a turn indicator pattern. The vehicle computer 702 can be prompted to cause the light source 714 for a variety of inputs. For example, a driver can move a turn signal lever to indicate a right turn or a left turn. The vehicle computer 702 can receive a signal indicating the movement of the turn signal lever and transmit a signal to the flasher 706 via the electrical system 710. The flasher 706 can connect with the light source 714 via the switches 716 to complete a circuit allowing electrical current to flow and allow the light source 714 to emit light. Similarly, the driver can push a hazard button to indicate a hazard. The vehicle computer 702 can receive a signal indicating the movement of the hazard button and transmit a signal to the flasher 706 via the electrical system 710. The flasher 706 can connect with the light source 714 and cause a hazard light pattern to be emitted.

In another scenario, the vehicle computer 702 can emit a signal to the light source in response to information received from the first sensor 712, rather than in response to manual driver input. In this scenario, the first sensor 712 can collect data for a mapping the surrounding environment, and transmit the data to the vehicle computer 702. The vehicle computer 702 can process the data and generate the mapping of the surrounding environment.

The positioning of the integrated sensor assembly 708 can permit the first sensor 712 to collect data that can generate a 360 degree mapping of the surrounding environment. For example, the first sensor 712 can be a LIDAR sensor that can be used to generate a three-dimensional point cloud by the vehicle computer. The elevated position of the integrated sensor assembly 708 can permit the first sensor 712 to collect information ahead of the AV, behind the AV, and to the side of the AV. The elevated position of the integrated sensor assembly 708 permits angling of the laser pulses to the surfaces (e.g., roofs, hoods, trunks) of surrounding vehicles. Consequently, this elevated position can provide better surface profiles of the surrounding vehicles and objects on a roadway. In addition, the elevated position of the integrated sensor assembly is less likely to be struck by an object or another vehicle.

In some instances, the integrated sensor assembly 708 can include more than one sensor. As illustrated, the first sensor 712 and a second sensor 718 are included in the integrated sensor assembly 708. The first sensor 712 can be, for example, a LiDAR sensor, and the second sensor 718 can be, for example, a temperature sensor, an image capturing sensor, a proximity sensor, a weather sensor, or other appropriate sensor. In some instances, the one sensor can cause electromagnetic interference with another sensor. Therefore, a shield (e.g., an electromagnetic interference (EMI) shield) 720 can be arranged to shield the first sensor 712 and the second sensor 718 from each other.

The integrated sensor assembly 708 further simplifies the electrical wiring process. As illustrated a single electrical system opening 722 permits the bus cable 724 to enter the integrated sensor assembly 708 and provides wiring for the first sensor 712, second sensor 718, and the light source 714. For example, rather than having wiring to a sensor connected to a side-view mirror arranged at one location on an AV and separate wiring for a hazard light and turn indicator light arranged at another location on the AV, the bus cable 724 can include wiring for both sensors and light source. Furthermore, the electrical system opening 722 offers a single point of ingress and egress into the integrated sensor assembly 708, which further simplifies the design.

Figure 8:
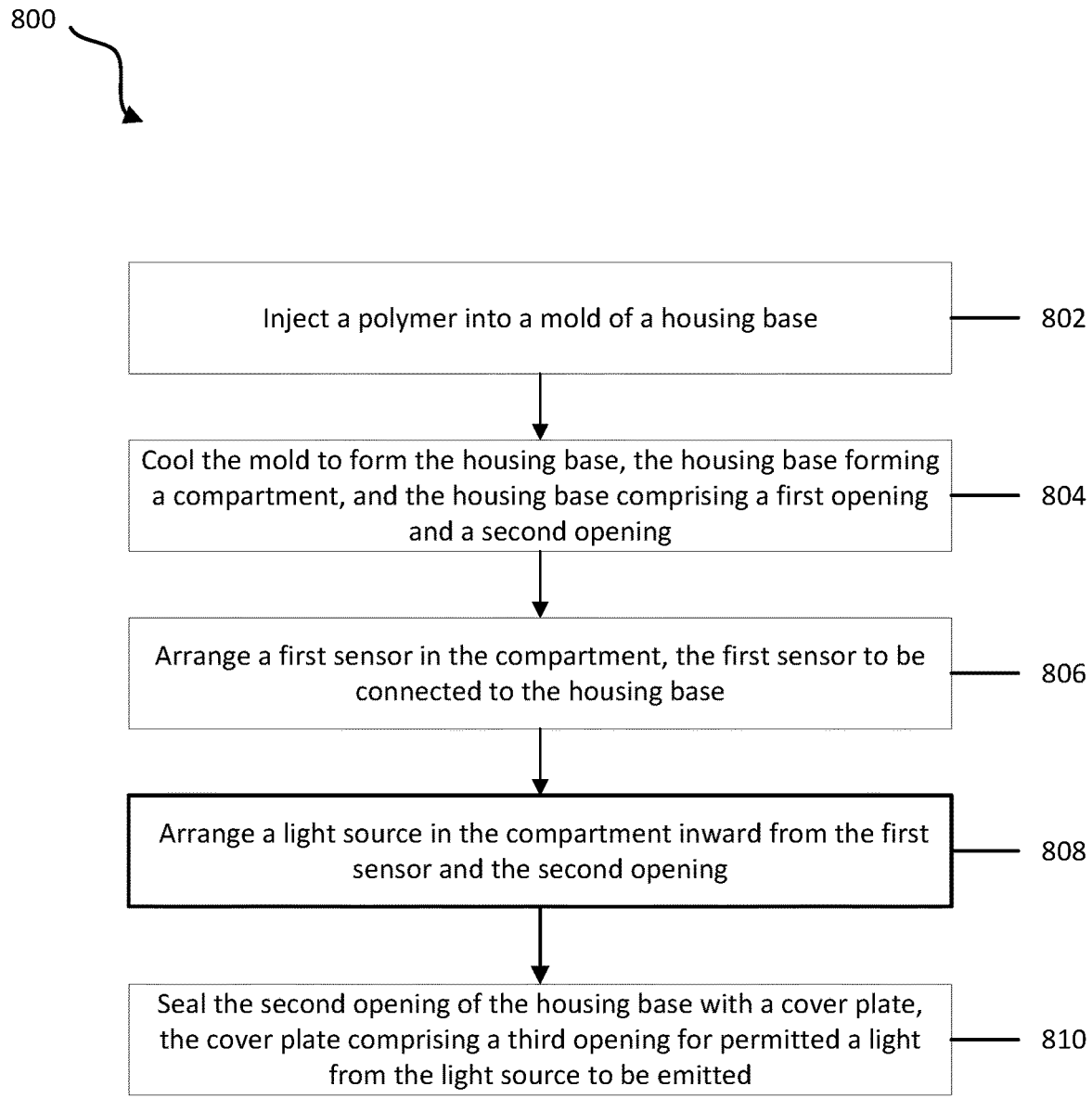
FIG. 8 is a method for fabricating an integrated sensor assembly, according to one or more embodiments.

FIG. 8 is a method for fabricating an integrated sensor assembly, according to one or more embodiments. At 802, the method can include injecting a polymer into a mold of a housing base. The mold can include an aerodynamic contour for generating an aerodynamic housing.

At 804, the method can include cooling the mold to form the housing base. The housing base can form a compartment, and the housing base can include a first opening and a second opening. In some instances, the method can further include connecting the housing base to an arm at another opening of the housing base. This opening can permit a bus cable to be extended into the housing base.

At 806, the method can include arranging a first sensor with the integrated sensor assembly. In some instances, the method can further include arranging a second sensor in the compartment. A shield can further be arranged inward from the first sensor and the second sensor. The shield can be configured to prevent electromagnetic signals from passing through the shield.

At 808, the method can include arranging a light source in the compartment inward from the second sensor and the second opening. In other words, the light source is arranged between the second sensor and the second opening.

At 810, the method can include sealing the second opening of the housing base with a cover plate, the cover plate comprising a third opening for permitting a light from the light source to be emitted to form an integrated sensor assembly. The integrated sensor assembly can be arranged on an autonomous vehicle proximate to a cabin roof of the autonomous vehicle.

Figure 9:
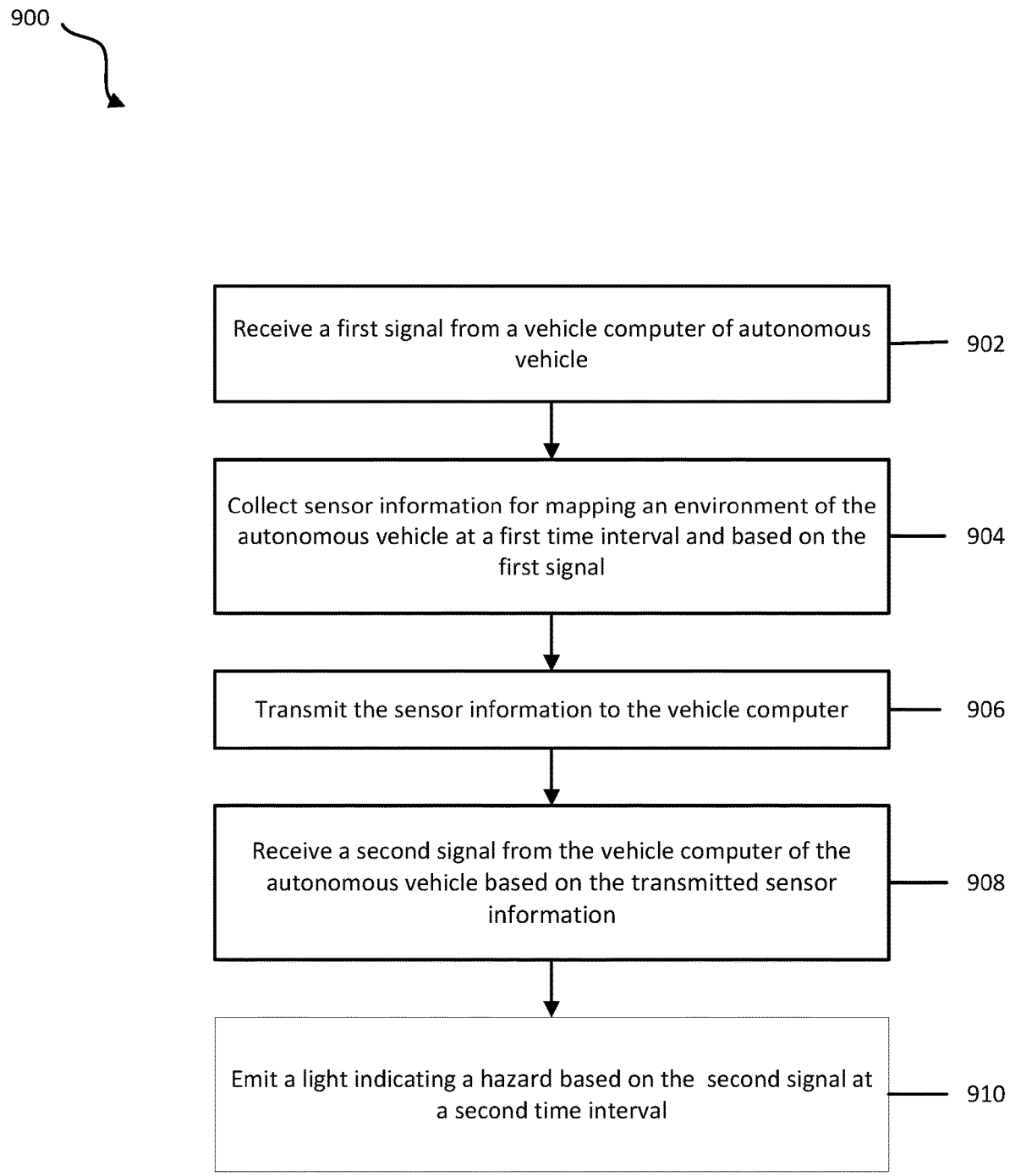
FIG. 9 is an illustration of process flow for an integrated sensor assembly, according to one or more embodiments.

FIG. 9 is an illustration of process flow for an integrated sensor assembly, according to one or more embodiments. The integrated sensor assembly can include a housing comprising a compartment. The housing can be arranged on a cabin of the autonomous vehicle and proximate to a cabin roof of the autonomous vehicle. A light source arranged in the compartment, the light source configured to receive a second signal from the vehicle computer and emit a light pattern for visually indicating a hazard. The light source can be arranged in the compartment to emit light to traffic to a rear of the autonomous vehicle.

At 902, the method can include an integrated sensor assembly receiving a first signal from a vehicle computer of an autonomous vehicle.

At 904, the method can include the integrated sensor assembly collecting first sensor information for mapping an environment of the autonomous vehicle at a first time interval and based on the first signal, the integrated sensor assembly arranged on a side surface of a cabin of the autonomous vehicle and proximate to a cabin roof of the autonomous vehicle.

At 906, the method can include the integrated sensor assembly transmitting the first sensor information to a vehicle computer.

At 908, the method can include the integrated sensor assembly receiving a second signal from the vehicle computer of the autonomous vehicle based on the transmitted sensor information. For example, the vehicle computer can receive the first sensor information and determine that the AV is approaching an obstacle in the road. The vehicle computer can transmit the second signal to cause the AV to indicate a turn. In some instances, the AV is in an autonomous mode and the determination to emit a turn signal is made by the vehicle computer rather than a manual shift of a turn signal lever by a driver.

At 910, the method can include the integrated sensor assembly emitting a light indicating a turn based on the second signal at a second time interval. The first time interval can overlap the second time interval, or the first time interval can be distinct from the second time interval.

In some instances, the integrated sensor assembly can collect second sensor information of an environment of the AV at a third time interval. The integrated sensor assembly can transmit the second sensor information to the vehicle computer. The integrated sensor assembly can receive a third signal from the vehicle computer of the autonomous vehicle based on the transmitted sensor information. The integrated sensor assembly can discontinue emitting the light based on the third signal.

FIG. 10 is a block diagram of an example of a vehicle computing system 1000 usable for implementing some aspects of the present disclosure. For example, the vehicle computing system 1000 can include a vehicle computing system for transmitting signals to the integrated sensor assembly. The vehicle computing system 1000 includes a processor 1002 coupled to a memory 1004 via a bus 1012. The processor 1002 can include one processing device or multiple processing devices. Examples of the processor 1002 include a Field-Programmable Gate Array (FPGA), an application-specific integrated circuit (ASIC), a microprocessor, or any combination of these. The processor 1002 can execute instructions 1006 stored in the memory 1004 to perform operations (e.g., instructions to collect sensor data or activate/deactivate a light source). In some examples, the instructions 1006 can include processor-specific instructions generated by a compiler or an interpreter from code written in any suitable computer-programming language, such as C, C++, C#, Python, or Java.

The memory 1004 can include one memory device or multiple memory devices. The memory 1004 may be non-volatile and include any type of memory device that retains stored information when powered off. Examples of the memory 1004 can include electrically erasable and programmable read-only memory (EEPROM), flash memory, or any other type of non-volatile memory. At least some of the memory 1004 includes a non-transitory computer-readable medium from which the processor 1002 can read instructions 1006. A computer-readable medium can include electronic, optical, magnetic, or other storage devices capable of providing the processor 1002 with computer-readable instructions or other program code. Examples of a computer-readable medium include magnetic disks, memory chips, ROM, random-access memory (RAM), an ASIC, a configured processor, optical storage, or any other medium from which a computer processor can read the instructions 1006.

The vehicle computing system 1000 may also include other input and output (I/O) components. The input components 1008 can include a mouse, a keyboard, a trackball, a touch pad, a touch-screen display, a turn signal level, or any combination of these. The output components 1010 can include a visual display, an audio display, a haptic display, or any combination of these. Examples of a visual display can include a liquid crystal display (LCD), a light-emitting diode (LED) display, and a touch-screen display. An example of an audio display can include speakers. Examples of a haptic display may include a piezoelectric device or an eccentric rotating mass (ERM) device.

The vehicle computing system 1000 can be in operable communication with an integrated sensor assembly 1014. The vehicle computing system 1000 can further be configured to transmit instructions to cause the integrated sensor assembly 1014 to perform any function described herein. The vehicle computing system 1000 can further be configured to receive sensor information from the integrated sensor assembly 1014 as described herein.

The above description of certain examples, including illustrated examples, has been presented only for the purpose of illustration and description and is not intended to be exhaustive or to limit the disclosure to the precise forms disclosed. Modifications, adaptations, and uses thereof will be apparent to those skilled in the art without departing from the scope of the disclosure. For instance, any examples described herein, can be combined with any other examples.

Although specific embodiments have been described, various modifications, alterations, alternative constructions, and equivalents are also encompassed within the scope of the disclosure. Embodiments are not restricted to operation within certain specific data processing environments but are free to operate within a plurality of data processing environments. Additionally, although embodiments have been described using a particular series of transactions and steps, it should be apparent to those skilled in the art that the scope of the present disclosure is not limited to the described series of transactions and steps. Various features and aspects of the above-described embodiments may be used individually or jointly.

Further, while embodiments have been described using a particular combination of hardware and software, it should be recognized that other combinations of hardware and software are also within the scope of the present disclosure. Embodiments may be implemented only in hardware, or only in software, or using combinations thereof. The various processes described herein can be implemented on the same processor or different processors in any combination. Accordingly, where components or modules are described as being configured to perform certain operations, such configuration can be accomplished, e.g., by designing electronic circuits to perform the operation, by programming programmable electronic circuits (such as microprocessors) to perform the operation, or any combination thereof. Processes can communicate using a variety of techniques, including but not limited to conventional techniques for inter process communication, and different pairs of processes may use different techniques, or the same pair of processes may use different techniques at different times.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific disclosure embodiments have been described, these are not intended to be limiting. Various modifications and equivalents are within the scope of the following claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments, and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known for carrying out the disclosure. Variations of those preferred embodiments may become apparent to those of ordinary skill in the art upon reading the foregoing description. Those of ordinary skill should be able to employ such variations as appropriate, and the disclosure may be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein.

All references, including publications, patent applications, and patents, cited herein are hereby incorporated by reference to the same extent as if each reference were individually and specifically indicated to be incorporated by reference and were set forth in its entirety herein.

In the foregoing specification, aspects of the disclosure are described with reference to specific embodiments thereof, but those skilled in the art will recognize that the disclosure is not limited thereto. Various features and aspects of the above-described disclosure may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. An integrated sensor assembly, comprising:
    a housing comprising a compartment, the housing arranged on a side surface of a cabin of an autonomous vehicle and a threshold elevation from a reference surface;
    a first sensor arranged in the compartment and configured to receive a first signal from a vehicle computer and collect information for mapping an environment of the autonomous vehicle;
    an arm connected at a first end to the housing and connected at a second end to the side surface of the cabin;
    an actuator for rotating the arm between a first state and a second state, the arm and the housing arranged externally to the side surface in the first state and the second state; and
    a light source arranged in the compartment, the light source configured to receive a second signal from the vehicle computer and emit a light pattern for visually indicating one of a hazard, a turn, or an autonomous mode, the light source arranged in the compartment to emit light to traffic toward a rear of the autonomous vehicle.

2. The integrated sensor assembly of claim 1, wherein the arm is extendable in an orthogonal direction from the side surface of the cabin.

3. The integrated sensor assembly of claim 1, wherein the housing and the arm are integrally formed.

4. The integrated sensor assembly of claim 1, wherein the light source comprises a first bulb for visually indicating one of the hazard or the turn, and wherein the light source comprises a second bulb for visually indicating the autonomous mode.

5. The integrated sensor assembly of claim 1, wherein the integrated sensor assembly further comprises:
    an electromagnetic interference shield configured to shield the first sensor from electromagnetic interference.

6. The integrated sensor assembly of claim 1, wherein the first sensor and the light source are wired to a bus cable of an electrical system, the bus cable extending into the compartment.

7. The integrated sensor assembly of claim 1, wherein the first sensor is a light detection and ranging (LiDAR) sensor.

8. The integrated sensor assembly of claim 7, wherein the housing further comprises:
    an opening for permitting the LiDAR sensor to collect reflected signal from the environment of the autonomous vehicle.

9. The integrated sensor assembly of claim 1, wherein the integrated sensor assembly is arranged on the side surface of the cabin at a higher elevation than a side-view mirror.

* * * * *